United States Patent [19]

Nitschke et al.

[11] Patent Number: 5,086,907
[45] Date of Patent: Feb. 11, 1992

[54] GLASS SHEET TRANSFERRING DEVICE

[75] Inventors: David B. Nitschke; Christopher Hersch, both of Perrysburg, Ohio

[73] Assignee: Glasstech, Inc., Perrysburg, Ohio

[21] Appl. No.: 600,304

[22] Filed: Oct. 17, 1990

[51] Int. Cl.5 ............................................. B65G 15/58
[52] U.S. Cl. .............................. 198/468.6; 198/468.8; 65/265; 65/289
[58] Field of Search ..................... 198/468.6, 468.8; 65/265, 289

[56] References Cited

U.S. PATENT DOCUMENTS

| | | | |
|---|---|---|---|
| 4,529,433 | 7/1985 | Bennett et al. | 65/289 X |
| 4,750,605 | 6/1988 | Brems et al. | 198/468.8 |
| 4,865,638 | 9/1989 | Kudo | 65/289 X |
| 4,934,511 | 6/1990 | Wood et al. | 198/468.6 X |

Primary Examiner—Joseph E. Valenza
Assistant Examiner—Keith L. Dixon
Attorney, Agent, or Firm—Brooks & Kushman

[57] ABSTRACT

A glass sheet transferring device (20) is disclosed as including a movably driven frame (30), a glass sheet lifting mechanism (32) and a walking beam mechanism (28) connected to the movably driven frame (30) to provide indexed transfer of a glass sheet G during its movement from a glass sheet forming station (22).

17 Claims, 5 Drawing Sheets

GLASS SHEET TRANSFERRING DEVICE

TECHNICAL FIELD

This invention relates to a glass sheet transferring device for conveying processed glass sheets and more particularly to a transferring device that indexes a glass sheet during the conveyance.

BACKGROUND ART

Conventional glass sheet transferring devices used in glass sheet processing systems include topside support devices, mold shuttles and conveyors of the roller and air support types. Typically, these systems provide continuing motion of a glass sheet during its transfer from processing apparatus in a processing operation. These transferring devices are unable to easily index the glass sheet during its movement.

Often, it is necessary or desirable to interrupt the continuous movement of the processed glass sheet to inspect it or to perform other post processing activities. The complexity of conventional transferring devices frustrates the interruption of these continuous transferring devices.

Furthermore, when using a conventional roller conveyor much of the glass sheet surface is contacted by conveyor rolls increasing the potential for scratches, marking (by materials that cannot stand the heat) and application of dirt and dust during the conveyance. Also, when a formed glass sheet breaks, the glass often becomes lodged between the rolls and into any hot contact material causing scratched glass sheets. Finally, a roller conveyor cannot be used to convey a bent glass sheet having wings pointed downward.

DISCLOSURE OF INVENTION

An of the present invention is to provide a glass sheet transferring device that indexes a formed glass sheet during its movement from forming apparatus.

Another object of the invention is to provide a transferring device that has minimum contact with the formed glass sheet and on which a hot contact material can be easily applied.

Another object of the invention is to provide a transferring device that can easily convey glass sheets having an upwardly facing convex surface.

In carrying out the above objects of the invention, a glass sheet transferring device for transferring a glass sheet includes a movably driven frame, a glass sheet lifting mechanism and a walking beam mechanism.

The frame receives the formed glass sheet from forming apparatus and shuttles the glass sheet in the direction of conveyance as the frame is controllably driven. The glass sheet lifting mechanism includes an elevator mechanism operable to lift the glass sheet upwardly off the frame and onto a catcher mechanism where the glass sheet is then supported in a raised position until it is subsequently released onto the walking beam mechanism. The lifting mechanism includes first and second actuators for actuating the elevator mechanism and the catcher mechanism respectively.

The walking beam mechanism includes a translating beam that is reciprocatingly movable in a generally horizontal plane between upstream and downstream directions of glass sheet conveyance. The walking beam mechanism also includes a lifting rail that is generally vertically movable between raised and lowered positions above and below the said horizontal plane. The walking beam mechanism further includes a third actuator for controllably raising and lowering the lifting rail to facilitate the indexed conveyance of the formed glass sheet through the transferring device.

A controller connected to the frame drive, first, second, and third actuators sequentially controls the relative movements of the transferring device.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
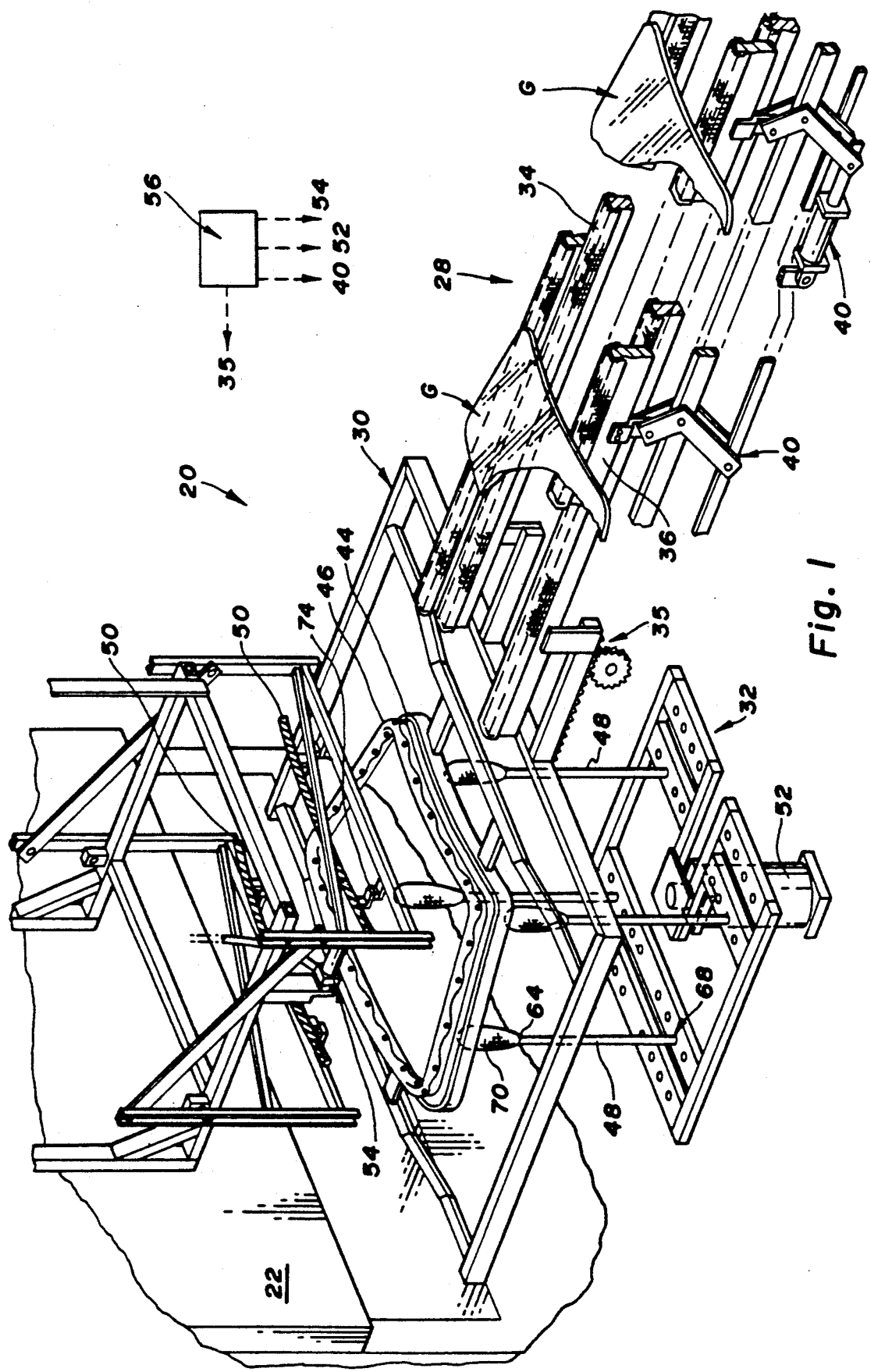
FIG. 1 is a perspective view partially in section of a glass sheet transferring device constructed in accordance with the present invention illustrating a movably driven frame, a glass sheet lifting and catcher mechanism, and a walking beam mechanism.

With reference to FIG. 1 of the drawings, a glass sheet transferring device constructed in accordance with the present invention is generally indicated by reference numeral 20 and is used for transferring or conveying formed glass sheets G that have been formed in glass sheet forming station 22. As is hereinafter more fully described, the glass sheet transferring device 20 is positioned proximate to the glass sheet forming station 22 and provides indexed conveyance of formed glass sheets G from the station 22. Indexing the formed glass sheets G during conveyance from the station 22 allows the glass sheets G to be annealed and inspected. Other advantages of the invention will be readily apparent from the following description.

Figure 2:
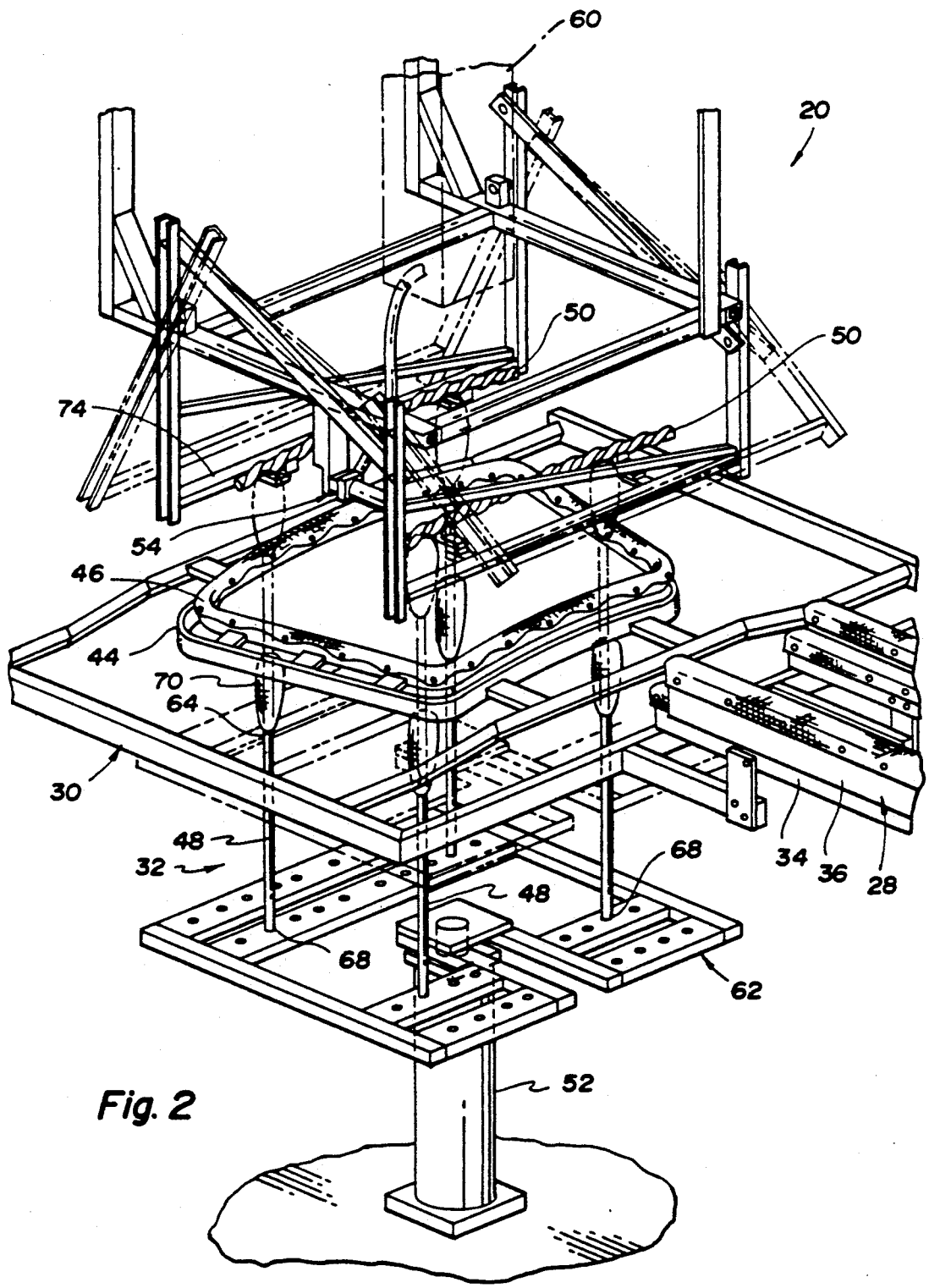
FIG. 2 is an enlarged perspective view of the glass sheet lifting mechanism illustrating elevator rods, the frame and glass sheet catcher bars.

As shown in FIGS. 1 and 2 of the drawings, the glass sheet transferring device 20 includes a walking beam mechanism 28, a movably driven frame 30 connected to and cooperable with the walking beam mechanism and a glass sheet lifting mechanism 32. The walking beam mechanism 28 includes two translating beams 34 reciprocatingly movable, as the frame 30 is moved, by rack and pinion drive 35, in a generally horizontal plane between upstream and downstream directions of glass sheet conveyance. In an alternative embodiment, the translating beams 34 include their own drive mechanism. The walking beam mechanism 28 also includes two lifting rails 36 that are generally vertically movable between raised and lowered positions above and below the said horizontal plane. The walking beam mechanism 28 further includes a piston actuated crank linkage 40 for raising and lowering the lifting rail 36.

Frame 30 is connected to translating beam 34, being bolted or welded to the translating beam, and is movable by the actuation of drive 35 with the translating beam for receiving and shuttling glass sheet G in the direction of conveyance. Frame 30 includes an annealing ring 44 or other support ring having a cloth covering 46 thereon for receiving the glass sheet G from forming station 22.

With reference to FIG. 2 of the drawings, glass sheet lifting mechanism 32 includes elevator rods 48 defining an elevator mechanism for lifting glass sheet G upwardly to a raised position off the annealing ring 44 of the frame 30 and for subsequently lowering the glass sheet onto the translating beam 34. The raised position of elevator rods 48 is illustrated in phantom. The lifting mechanism 32 also includes a glass sheet catching mechanism 50 defined by catcher bars for receiving and supporting glass sheet G in the raised position above the elevator rods 48 and said horizontal plane.

The raised glass sheet G is subsequently removed from the glass sheet catcher bars 50 and lowered onto the translating beam 34 of the walking beam mechanism 28 as is further hereinafter disclosed. A first actuator 52 actuates the vertical movement of elevator rods 48 and a second actuator 54 actuates the movements of the catcher bars 50. Preferably, first actuator 52 is a piston and cylinder assembly and second actuator 54 is a piston and cylinder actuated linkage assembly.

The glass sheet transferring device 20 includes a controller 56, schematically illustrated in FIG. 1, connected to the frame drive 35, first and second actuators 52, 54 and piston actuated crank linkage 40 for controlling the relative movements of the transferring device 20.

With further reference to FIG. 2 of the drawings, the elevator rods 48 extend vertically from a base 62 and are arranged in a pattern corresponding to the shape or outline of the formed glass sheet G. Distal ends 64 of the rods 48 are preferably elevationally arranged to conform to the contour of the formed glass sheet G. Rods 48 have means for adjustment 68 enabling the length of the rods above the base 62 to be increased or decreased relative to the base to adjust the contour formed by the distal ends 64. The adjustment means 68 is defined by screw threads on elevator rods 48 and corresponding screw threads on the base 62 mounting the rods. Each distal end 64 of the rods 48 includes a covering 70 of a non-abrasive resilient low heat transfer material for contacting the glass sheet G without marking it.

Glass sheet catcher bars 50 are mounted by a support 74 which forms part of the actuated linkage assembly of actuator 54. Support 74 allows the catcher bars 50 to be easily changed so that catcher bars having the appropriate contour are used. Catcher bars 50 are also preferably configured to the shape and contour of the glass sheet G being transferred. Support 74 is moved as the second actuator 54 is operated during the controlled operation of the glass sheet transferring device 20.

OPERATION OF THE INVENTION

FIGS. 3–11 illustrate through schematic illustrations the sequence of movements glass sheet transferring device 20 undergoes during a transferring cycle.

Figure 3:
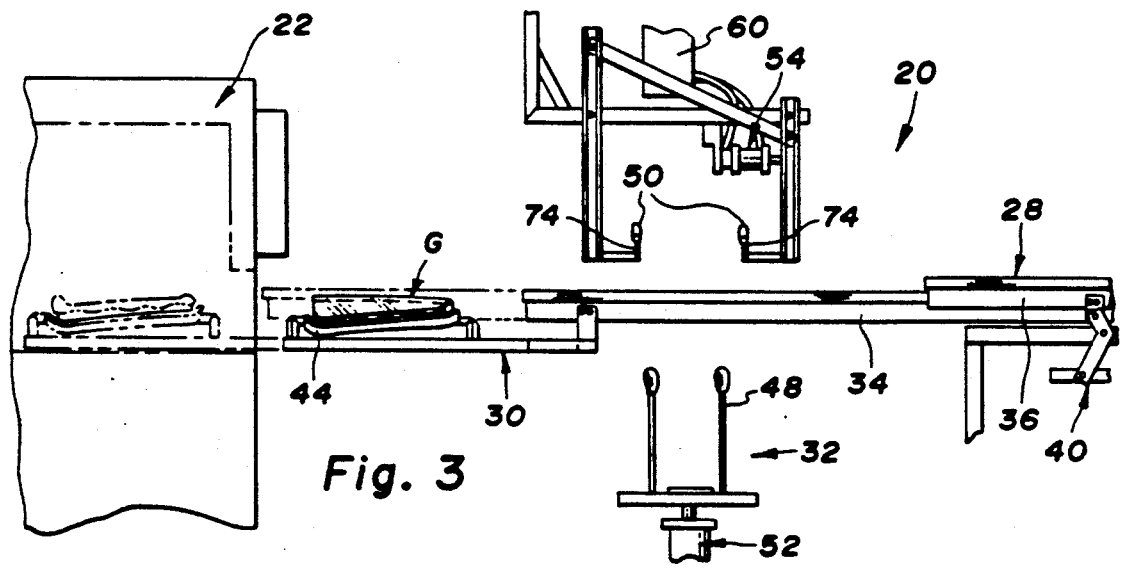
FIG. 3 is a schematic view of the glass sheet transferring device illustrating the frame indexed in a first annealing position after exiting a glass sheet forming station with a formed glass sheet.

In FIG. 3, glass sheet G has been received on the annealing ring 44 of the frame 30 from inside the glass sheet forming station 22. Glass sheet G has been moved as is illustrated in phantom in the direction of glass sheet conveyance by movement of the frame 30 to a first annealing position defined as the location between the forming station 22 and glass sheet lifting mechanism 32. Frame 30 is indexed in the direction of conveyance by rack and pinion drive 35. At this first position, the glass sheet G is stopped, allowed to cool without the aid of a quench and inspected before being indexed to its second position at the lifting mechanism, illustrated in FIG. 4.

Figure 4:
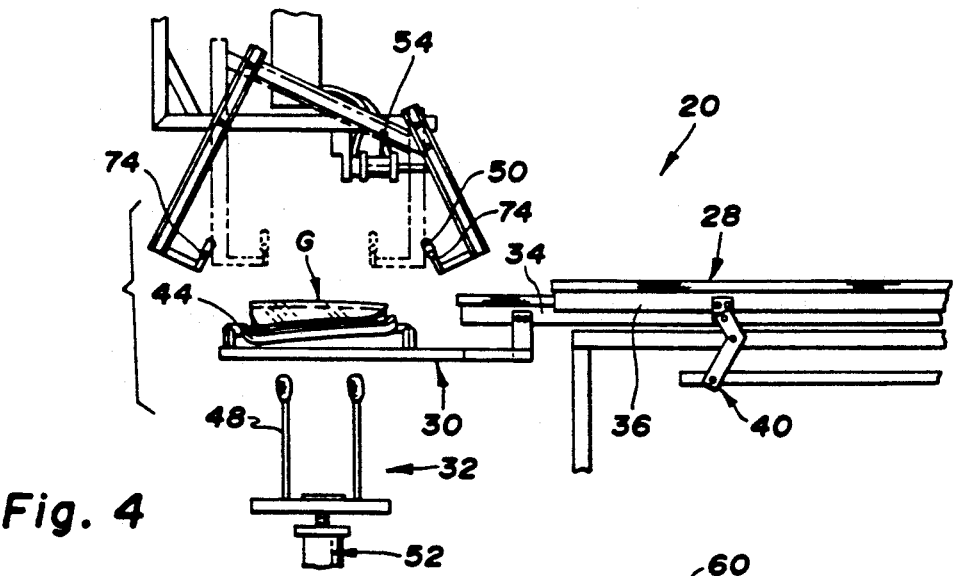
FIG. 4 is a schematic view of the glass sheet transferring device illustrating the frame in a second position at the glass sheet lifting mechanism.

In FIG. 4, frame 30 is at its second position, having been moved along the direction of glass sheet conveyance by drive 35, and the glass sheet catcher bars 50 are actuated by second actuator 54 to move the catcher bars outwardly relative to one another in preparation for receiving glass sheet G from the frame 30.

Figure 5:
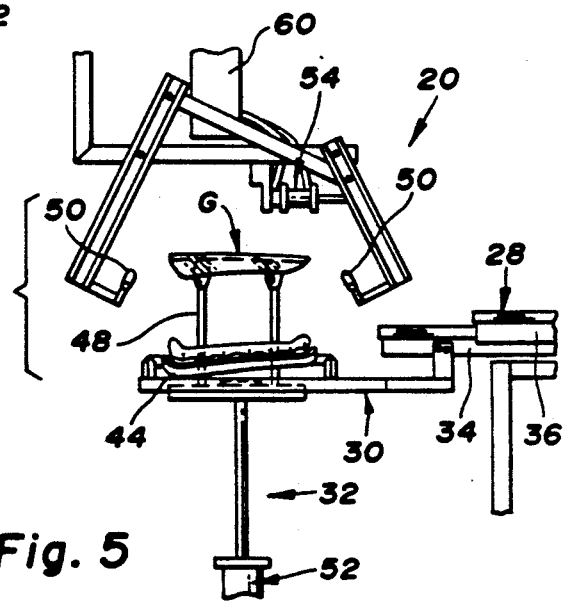
FIG. 5 is a schematic view of the glass sheet transferring device illustrating a glass sheet being elevated upwardly off the frame and the glass sheet catcher bars being positioned for receiving the formed glass sheet.
Figure 6:
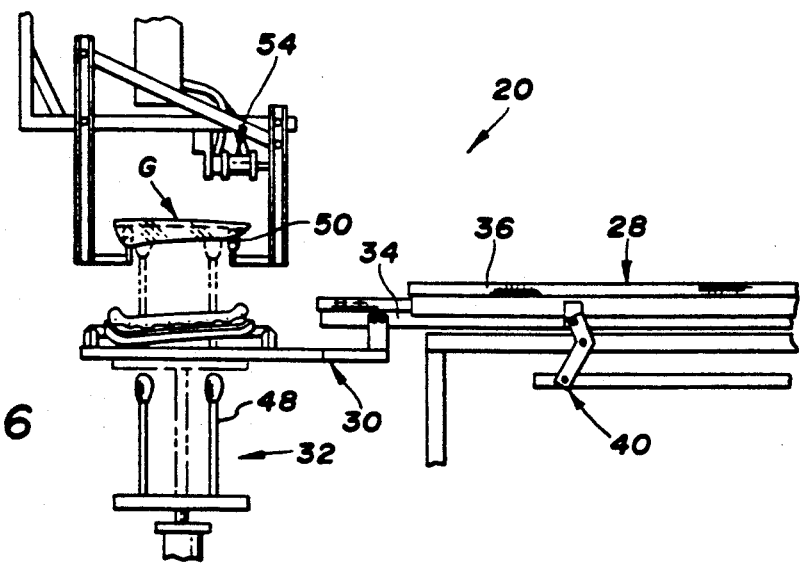
FIG. 6 is a schematic view of the glass sheet transferring device illustrating the formed glass sheet being supported by the glass sheet catcher bars above the frame and the elevator rods having been lowered to a lowered position.

As shown in FIG. 5, glass sheet G is raised by the actuation of the elevator rods 48 off the annealing ring 44 into the raised position of the elevator rods above the frame 30 where the catcher bars 50 can be actuated to get under the glass sheet G and hold it in the raised position as illustrated in FIG. 6. After the catcher bars 50 are actuated to be positioned under the raised glass sheet G, the elevator rods 48 are lowered by the operation of first actuator 52 to be brought to the lowered position of the elevator rods leaving the glass sheet G on the catcher bars.

Figure 7:
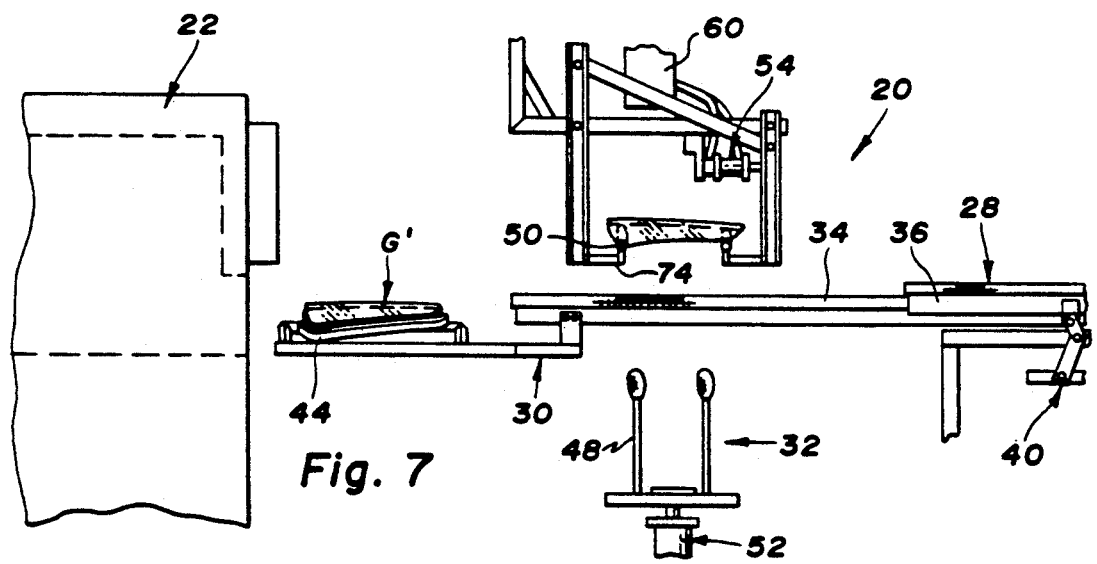
FIG. 7 is a schematic view of the glass sheet transferring device illustrating the frame indexed in the first annealing position after exiting the glass sheet forming station with a second sheet of formed glass and also illustrating a translating beam positioned under the first glass sheet being supported by the glass sheet catcher bars.

In FIG. 7, the glass sheet G is on the catcher bars 50 and the frame 30 is moved upstream against the direction of glass sheet conveyance back to the forming station 22 to receive a second glass sheet G on the annealing ring 44 of the frame. This second glass sheet G' is brought to the first position of the frame between the forming station and the glass sheet lifting mechanism 32 for cooling and inspection as herein above described.

Figure 8:
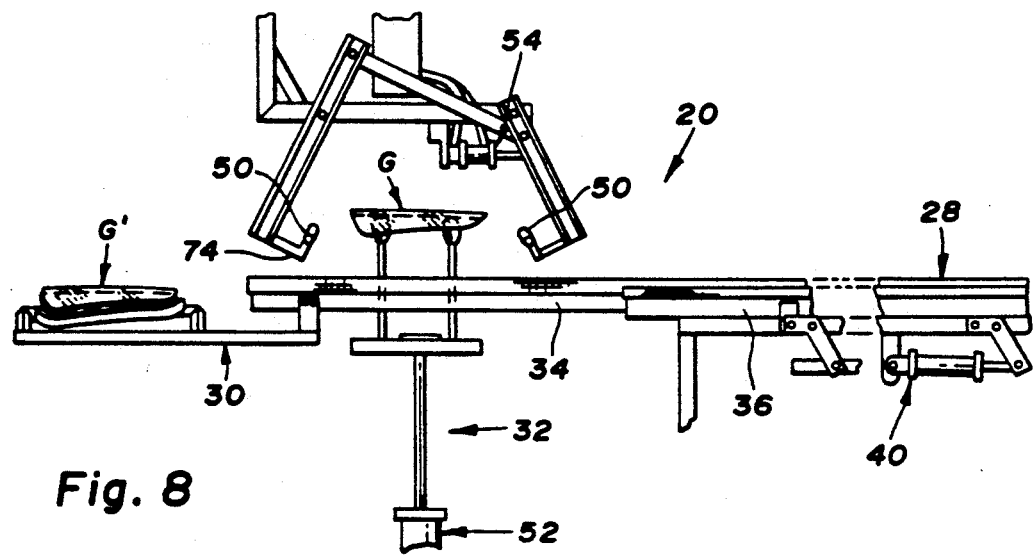
FIG. 8 is a schematic view of the glass sheet transferring device illustrating the elevator rods in a raised position again supporting the first glass sheet and the catcher bars removed.
Figure 9:
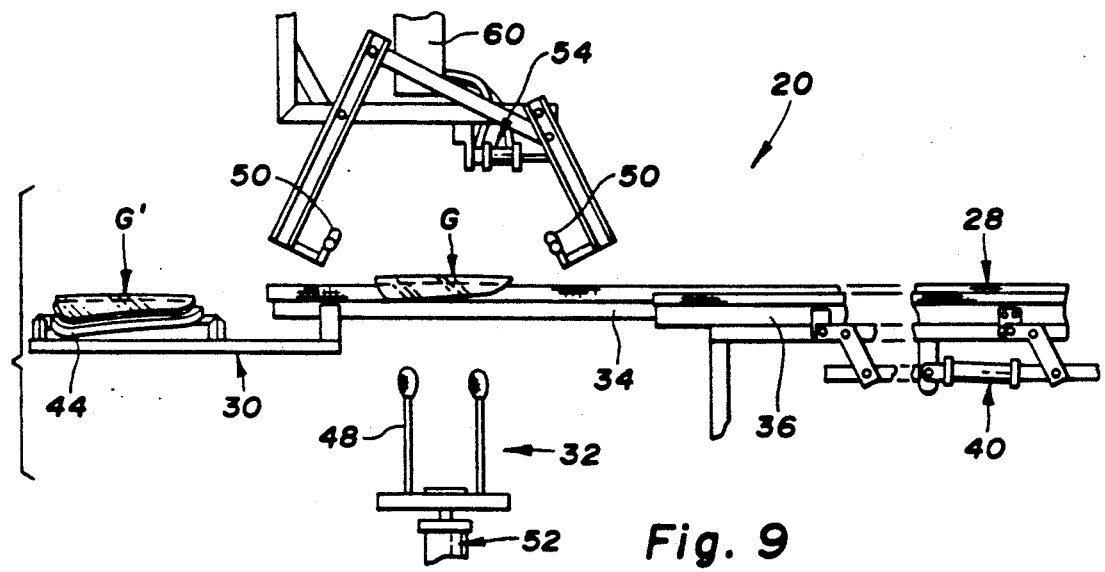
FIG. 9 is a schematic view of the glass sheet transferring device indexed in the first annealing position illustrating the elevator in the lowered position and the glass sheet having been lowered onto the translating beam.

With continued reference to FIG. 7 and with reference to FIG. 8, the first glass sheet G is in the raised position above the translating beam 34 and the elevator rods 48 are raised to lift the first glass sheet off the catcher bars 50. The catcher bars 50 are then displaced to allow the first glass sheet G to be lowered and set on translating beam as the elevator rods 48 are lowered below the translating beam, as shown in FIGS. 8 and 9, for subsequent indexed conveyance in the direction of glass sheet conveyance.

Figure 10:
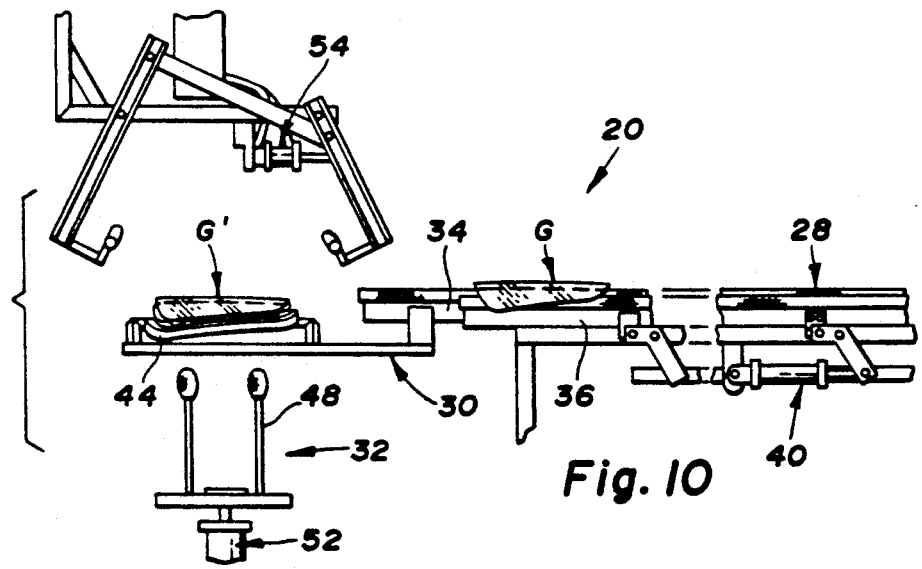
FIG. 10 is a schematic view of the glass sheet transferring device illustrating the frame indexed in its second position at the lifting mechanism in preparation for removal of the second formed glass sheet from the frame, the first glass sheet having been moved by the translating beam.

In FIG. 10, frame 30 is next moved into the second position by the movement of the drive 35 so that the second glass sheet G' can be unloaded onto the catcher bars 50, in the manner as the first glass sheet G had previously been unloaded onto the catcher bars. With the movement of the frame 30 from the first position to the second position along the direction of glass sheet conveyance, the glass sheet G on the translating beam 34 is moved.

Figure 11:
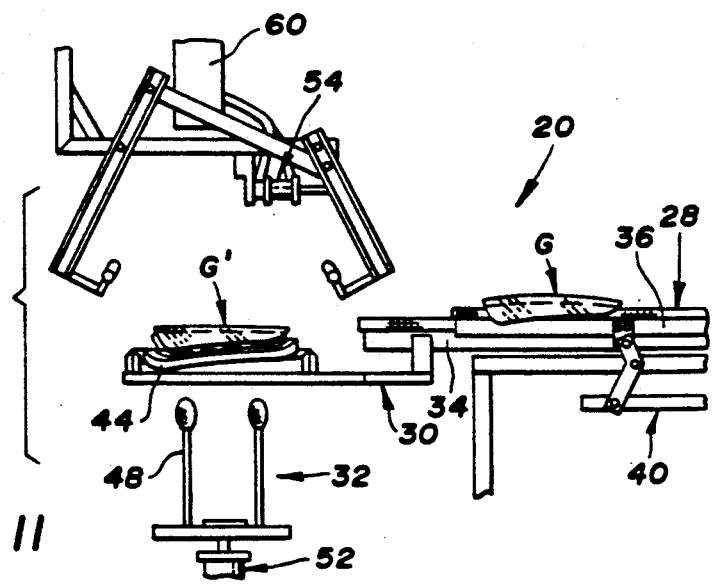
FIG. 11 is a schematic view of the transferring device illustrating the frame indexed in its second position for removal of the second formed glass sheet and also illustrating a lifting rail in a raised position supporting the first glass sheet above the translating beam for cycling of the frame back to the forming station for receiving another bent glass sheet.

As illustrated in FIG. 11 of the drawings, as the second glass sheet G' at the second position is about to be unloaded, by the lifting mechanism 32, the lifting rail 36 of the walking beam mechanism 28 is raised to elevate the first glass sheet G and any glass sheets on the translating beam 34 to an elevated position above the said horizontal plane in which the translating beam and frame are moved, so that the frame 30 and translating beam can again be moved upstream against the direction of glass sheet conveyance for receiving subsequent glass sheets without upstream movement of glass sheets already on the walking beam mechanism 28.

While the best mode for carrying out the invention has been described in detail, those familiar with the art to which this invention relates will recognize various alternative designs and embodiments for practicing the invention as defined by the following claims.

What is claimed is:

1. A glass sheet transferring device for transferring a formed glass sheet from a glass sheet forming station, the device comprising:
    a movable frame having a support ring mounted thereon for receiving the glass sheet;
    said frame including a drive for moving said frame;
    an elevator mechanism mounted below the frame and defining in part a glass sheet lifting mechanism for raising the formed glass sheet upwardly off the support ring;
    a glass sheet catcher mechanism in cooperable operation with said elevator mechanism and completing the definition of the glass sheet lifting mechanism for receiving the raised glass sheet from said elevator mechanism and for supporting the glass sheet as said elevator mechanism is lowered;
    an elevator actuator for actuating the vertical movement of said elevator mechanism;
    a catcher actuator for actuating the operation of said catcher mechanism; and
    a controller controlling the cooperable operation of said elevator and catcher mechanism.

2. A device as in claim 1 further including a walking beam mechanism having a translating beam and a lifting rail for receiving the glass sheet from the elevator mechanism and subsequently transferring the glass sheet along said walking beam mechanism; said translating beam being connected to said frame and also being reciprocatingly movable in a generally horizontal plane between upstream and downstream directions of glass sheet conveyance by the movement of said frame; said lifting rail being generally vertically movable between raised and lowered positions above and below said horizontal plane.

3. A device as inn claim 2 including a lifting rail actuator for actuating the movement of said lifting rail; said lifting rail actuator being controlled by said controller.

4. A glass sheet transferring device for transferring a formed glass sheet from a glass sheet forming station, the device comprising:
    a frame having a support ring mounted thereon for receiving the glass sheet from the glass sheet forming station; said frame including a drive for moving said frame in a generally horizontal plane in the direction of glass sheet conveyance;
    a glass sheet lifting mechanism including an elevator mechanism for lifting the glass sheet upwardly off said frame; said lifting mechanism also including a glass sheet catcher mechanism for receiving and supporting the raised glass sheet; said lifting mechanism further including a first actuator for actuating the vertical movement of said elevator mechanism and a second actuator for actuating the operation of said catcher mechanism; and
    a walking beam mechanism including a translating beam being reciprocatingly movable in a generally horizontal plane between upstream and downstream directions of glass sheet conveyance; said translating beam receiving the raised glass sheets from said lifting mechanism as said catcher mechanism releases the glass sheet onto a raised elevator mechanism and said elevator mechanism is lowered; said walking beam mechanism also including a lifting rail being generally vertically movable between raised and lowered positions above and below said horizontal plane for subsequently receiving the formed glass sheet from said translating beam; said walking beam mechanism further including a third actuator for raising and lowering said lifting rail to provide indexed movement of the formed glass sheet along the walking beam mechanism as the glass sheet is moved in the direction of conveyance by the movement of said translating beam when said lifting rail is lowered, and the glass sheet is maintained stationary as said lifting rail is raised and said translating beam is moved upstream.

5. A device as in claim 4 wherein said translating beam is connected to said frame and movable by the movement of said frame.

6. A device as in claim 4 further including a controller for sequentially controlling the relative movements of said frame drive and actuators.

7. A device as in claim 4 further including a drive for moving said translating beam independently from the movement of said frame.

8. A device as in claim 7 further including a controller for controlling the relative movements of said frame and translating beam drives and actuators.

9. A device as inn clam 4 wherein said first actuator is a piston and cylinder assembly.

10. A device as in claim 4 wherein said second actuator is a piston actuated crank, linkage assembly.

11. A devices as in claim 4 wherein said frame drive is a rack and pinion assembly.

12. A device as in claim 4 wherein said elevator mechanism includes a base and a plurality of rods vertically extending from said base.

13. A device as in claim 12 wherein said rods have means for adjusting the length of said rods above said base to change the contour formed by the distal ends of said rods.

14. A device as in claim 13 wherein said adjustment means includes screw threads on said rods and corresponding screw threads on said base mounting said rods.

15. The device as in claim 12 wherein said rods have a covering of a non-abrasive, resilient low heat transfer material mounted on each distal end for contacting the glass sheet.

16. A device as in claim 4 wherein said glass sheet catcher mechanism includes a pair of catcher bars and a support mounting said bars.

17. A glass sheet transferring device for transferring a formed glass sheet from a glass sheet forming station, the device comprising:
- a frame having a support ring mounted thereon for receiving the glass sheet from the glass sheet forming station; said frame including a rack and pinion drive for moving said frame in a generally horizontal plane in the direction of glass sheet conveyance;
- a glass sheet lifting mechanism including a plurality of lifting rods mounted below the plane of conveyance for lifting the glass sheet upwardly off said frame by the vertical movement of said rods; said lifting mechanism also including a pair of glass sheet catcher bars for receiving and supporting the raised glass sheet from raised lifting rods;
- a walking beam mechanism including a pair of translating beams connected to said frame and being reciprocatingly movable by the movement of said frame in a generally horizontal plane between upstream and downstream directions of glass sheet conveyance; said translating beams receiving the raised glass sheets from said catcher bars as the glass sheet is subsequently lowered by said lifting rods; said walking beam mechanism also including a pair of lifting rails generally vertically movable between raised and lowered positions above and below said horizontal plane for subsequently receiving the formed glass sheet from said translating beams and walking glass sheets on the walking beam mechanism inn the direction of conveyance by the controlled movements of the translating beams and lifting rails.

* * * * *